United States Patent [19]
Kennedy et al.

[11] Patent Number: 5,702,061
[45] Date of Patent: Dec. 30, 1997

[54] FOOD GRATER

[75] Inventors: Timothy J. Kennedy; Davin Stowell, both of New York; Scott Bolden, Brooklyn, all of N.Y.

[73] Assignee: General Housewares Corp., Terre Haute, Ind.

[21] Appl. No.: 618,776

[22] Filed: Mar. 20, 1996

[51] Int. Cl.[6] .................................................. A47J 43/25
[52] U.S. Cl. ................................. 241/93; 241/273.3
[58] Field of Search ......................... 241/273.3, 93

[56] References Cited

U.S. PATENT DOCUMENTS

| | | |
|---|---|---|
| 138,191 | 4/1873 | Platt . |
| D. 235,501 | 6/1975 | Mantelet . |
| D. 276,202 | 11/1984 | Shun . |
| D. 347,978 | 6/1994 | Ritota . |
| 445,769 | 2/1891 | Chamberlin . |
| 507,287 | 10/1893 | Scarles . |
| 762,497 | 6/1904 | Snyder . |
| 855,423 | 5/1907 | Alger . |
| 1,114,411 | 10/1914 | Stuver ............................ 241/93 X |
| 1,205,052 | 4/1933 | Spencer et al. . |
| 2,670,019 | 2/1954 | Cuyler ............................ 41/93 |
| 3,581,790 | 6/1971 | Del Conte . |
| 3,912,176 | 10/1975 | Mantelet . |
| 5,148,995 | 9/1992 | Hurst . |
| 5,163,628 | 11/1992 | Arnold . |
| 5,364,037 | 11/1994 | Bigelow . |
| 5,435,237 | 7/1995 | Huang . |

FOREIGN PATENT DOCUMENTS

| | | | |
|---|---|---|---|
| 827363 | 1/1952 | Germany .................................. 241/93 |
| 55501 | 1/1984 | Taiwan . |
| 117980 | 9/1989 | Taiwan . |
| 1009330 | 4/1983 | U.S.S.R. .................................. 241/93 |

*Primary Examiner*—Mark Rosenbaum
*Attorney, Agent, or Firm*—Emrich & Dithmar

[57] ABSTRACT

A food grater is provided. The food grater includes a housing sidewall and a grater blade disposed adjacent to the housing sidewall. The grater further includes a moveable door having an extension, the moveable door being connected to the housing sidewall for movement between open and closed positions. In each of these positions at least a portion of the extension is disposed between the housing sidewall and the grater blade with a greater portion of the extension being disposed between the housing sidewall and the grater blade when the door is in the closed position than when the door is in the open position. The door cooperates with the housing sidewall to encompass the blade. The door also cooperates with the grater blade to define a variable-volume food-receiving compartment which has a greater volume when the moveable door is in the open position than when the moveable door is in the closed position. The grater further includes an actuator coupled to the grater blade or housing sidewall for effecting relative movement therebetween. The grater blade may also be cylindrical and have teeth disposed about its outer surface in a spiral pattern.

21 Claims, 4 Drawing Sheets

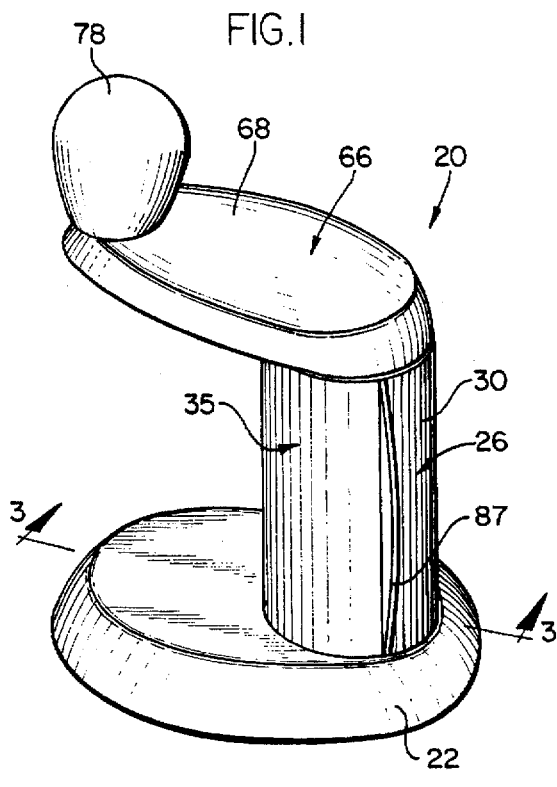
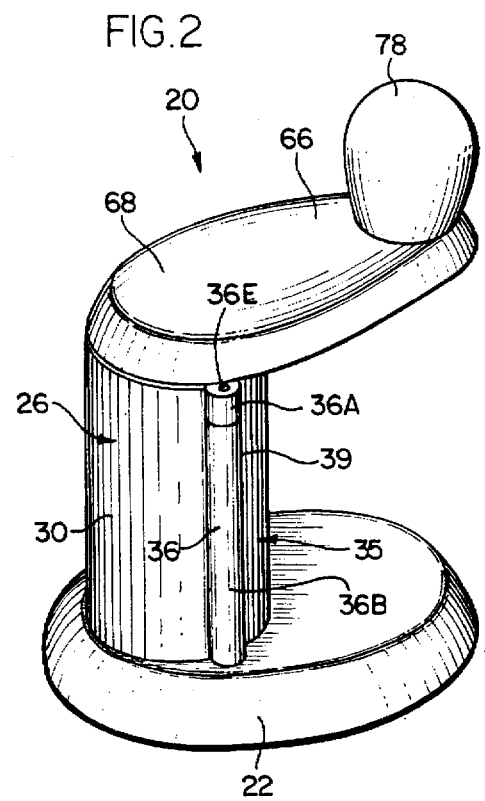
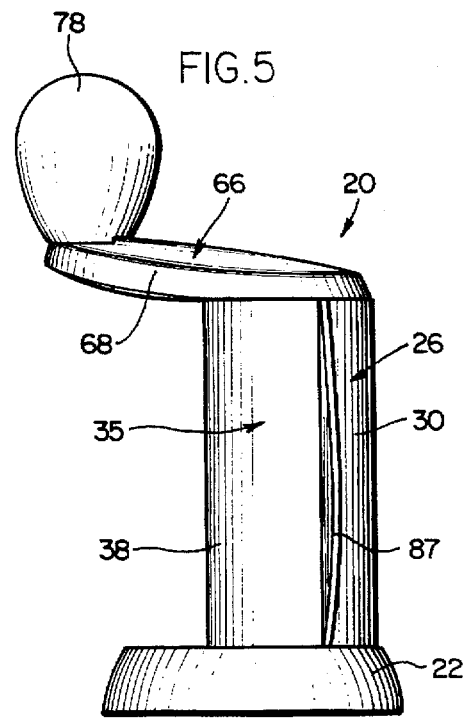
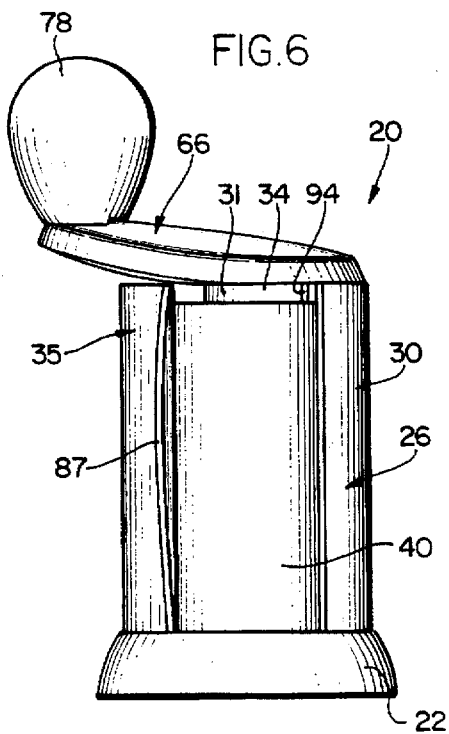

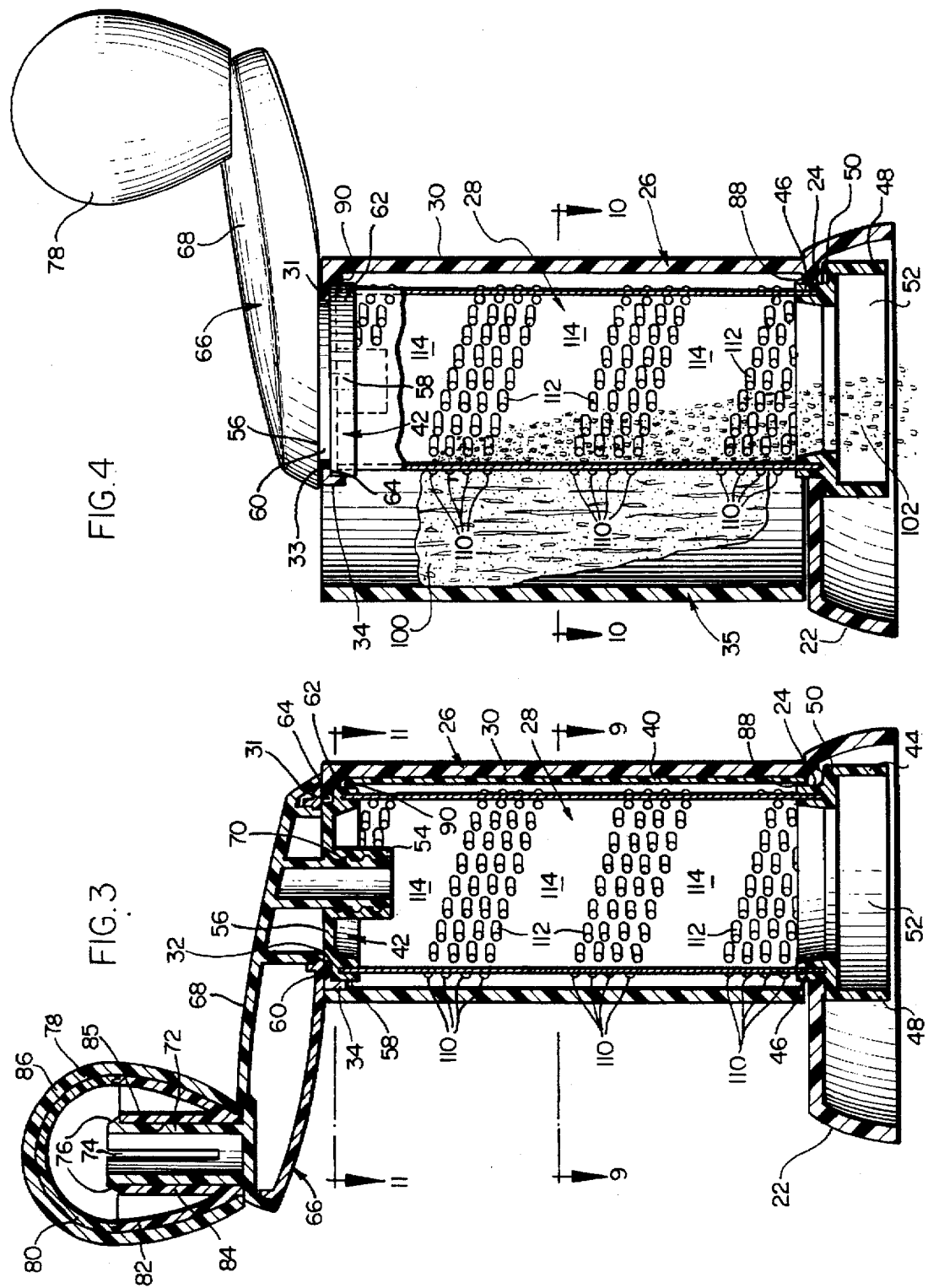

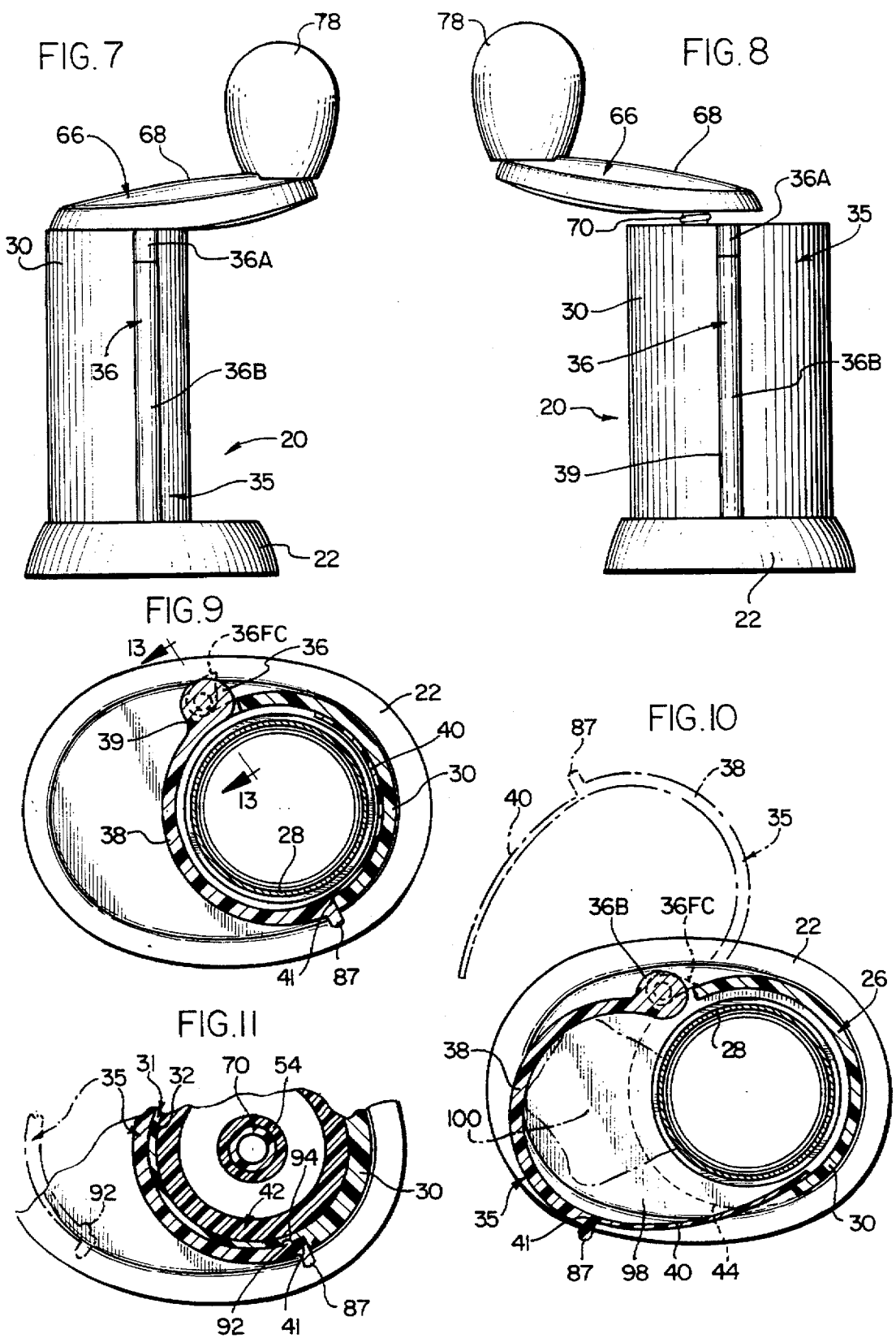

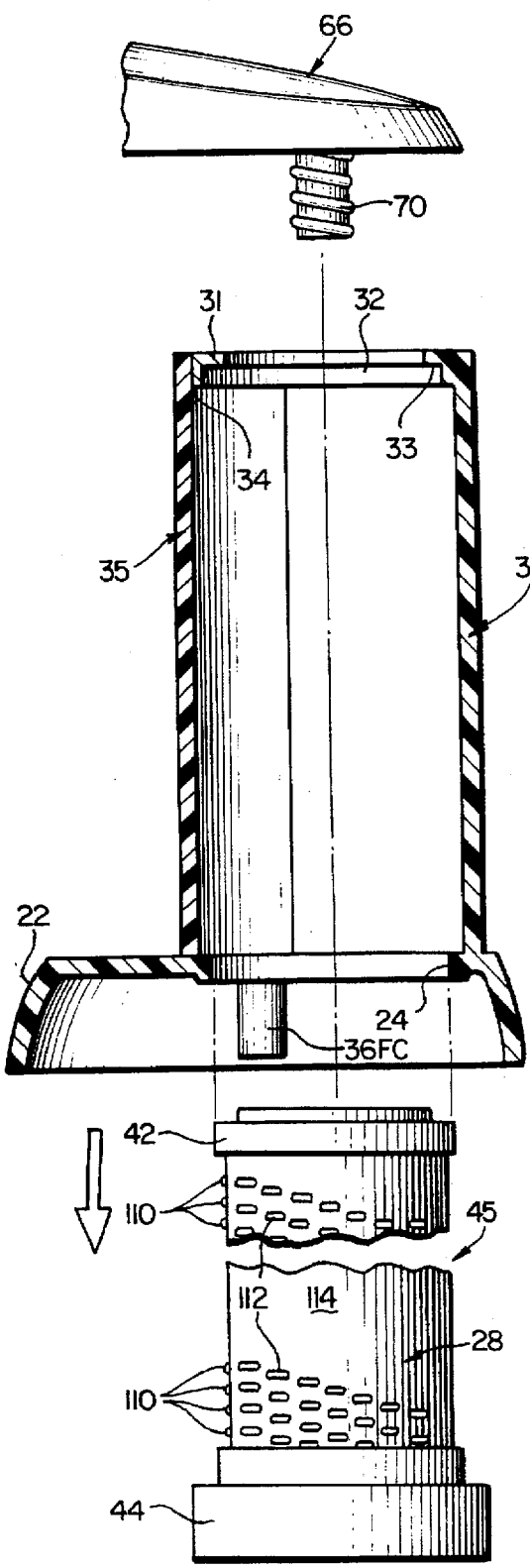
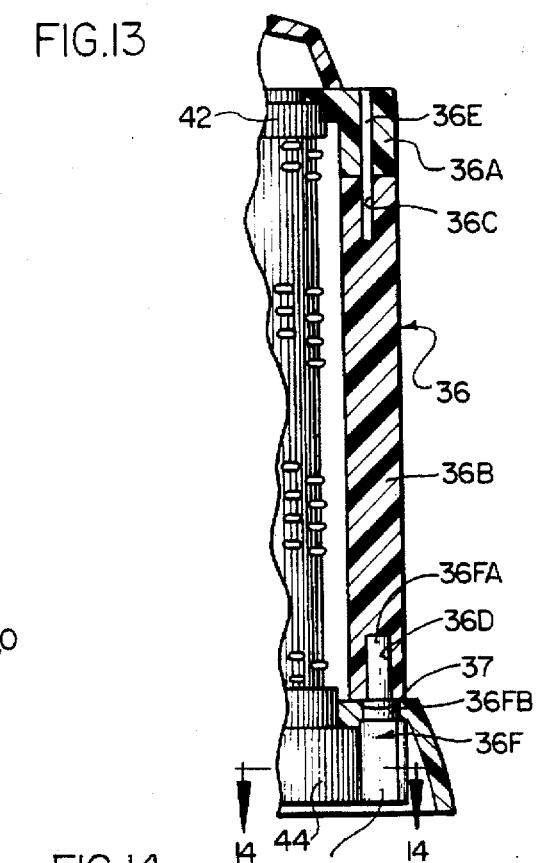
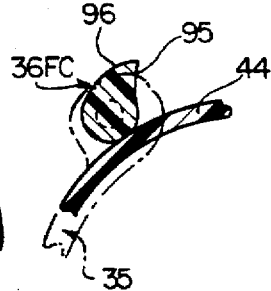
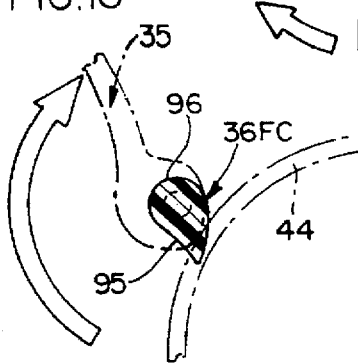

FOOD GRATER

BACKGROUND OF THE INVENTION

1. Field of the Invention

This invention relates to graters for food, such as cheese and, more particularly, to manual graters with expandable compartments to hold the food to be grated.

2. Description of the Prior Art

Manual graters with moveable chambers to house food to be grated have previously been provided. Several of these chambers include a U-shaped moveable member having two parallel sidewalls and an end wall. The U-shaped moveable member is moveable along a base toward a rotatable grater blade located within a larger opposed U-shaped housing having two parallel sidewalls and a back wall. The two sidewalls of the U-shaped moveable member are disposed closer together than the two sidewalls of the housing so they can each move between the blade and a housing sidewall. A wedge of cheese is placed in the chamber and a user presses the moveable member inwardly to cause the cheese to contact the rotatable blade, while rotating a handle connected to the blade to grate the cheese which falls through an exit hole at the bottom of the grater.

The rotatable blade, in such a grater, must be placed far enough forward of the back wall of the housing to allow the ends of sidewalls of the U-shaped moveable member to have enough clearance so that the cheese wedge can be brought as close as possible to the rotatable blade to grate as much of the cheese as possible.

This clearance space needed behind the rotatable blade requires additional material and increases the cost of such a grater. Additionally, the extra space requires a user to use a larger grip to hold the grater, even when there is no cheese in the grater.

Further, when the cheese wedge becomes small, the end wall of the U-shaped moveable member is disposed within the U-shaped housing (i.e., past the plane of the ends of the two housing sidewalls). The housing sidewalls interfere with the use of the grater and a user is only able to press the end wall with his fingertips to bring the cheese in contact with the rotatable blade thereby making grating of the last portion of cheese difficult.

SUMMARY OF THE INVENTION

It is a general object of the invention to provide a manual food grater which avoids the disadvantages of prior food graters while affording additional structural and operational advantages.

An important feature of the present invention is the provision of a manual food grater which is of simple and economical construction.

Another feature of the present invention is the provision of a manual food grater which has an ergonomic configuration which allows an entire piece of food to be easily grated.

A still further feature is the provision of a food grater of the type set forth which is compact and minimizes wasted space.

Yet another feature is the provision of a food grater of the type set forth which requires less manual power to operate.

These and other features of the invention are attained by providing a food grater. The food grater includes a housing sidewall and a grater blade disposed adjacent to the housing sidewall. The grater also includes a moveable door having an extension. The moveable door is connected to the housing sidewall for movement between open and closed positions. In each of these positions at least a portion of the extension is disposed between the housing sidewall and the grater blade with a greater portion of the extension being disposed between the housing sidewall and the grater blade when the door is in the closed position than when the door is in the open position. The door cooperates with the housing sidewall to encompass the grater blade. The door also cooperates with the grater blade to define a variable-volume food-receiving compartment which has a greater volume when the moveable door is in the open position than when the moveable door is in the closed position. The grater also includes an actuator coupled to the grater blade or housing sidewall for effecting relative movement therebetween.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a front perspective view of the grater of the present invention in the closed position;

FIG. 2 is a rear perspective view of the grater of FIG. 1;

FIG. 3 is an enlarged sectional view taken generally along the line 3—3 of FIG. 1;

FIG. 4 is a sectional view similar to FIG. 3, illustrating the grater in the open position;

FIG. 5 is a front side elevational view of the grater of FIG. 1;

FIG. 6 is a view similar to FIG. 5 with the grater in the open position;

FIG. 7 is a rear side elevational view of the grater of FIG. 1;

FIG. 8 is a view similar to FIG. 7 illustrating the door in crank assembly a raised state;

FIG. 9 is a sectional view taken generally along the line 9—9 of FIG. 3;

FIG. 10 is a sectional view taken generally along the line 10—10 of FIG. 4 and illustrating the cleaning position of the door in phantom;

FIG. 11 is a fragmentary, sectional view taken generally along the line 11—11 of FIG. 3;

FIG. 12 is a fragmentary, exploded view, partially in section, of the grater of FIG. 1;

FIG. 13 is a sectional view taken generally along the line 13—13 of FIG. 9;

FIG. 14 is a fragmentary, sectional view taken generally along the line 14—14 of FIG. 13;

FIG. 15 is a view similar to FIG. 14, where the stop is in the engaged position; and FIG. 16 is a view similar to FIG. 15, illustrating the stop and the door (in phantom) in the cleaning position.

DETAILED DESCRIPTION OF THE PREFERRED EMBODIMENT

Referring to the drawings, a grater 20, for grating food such as cheese, is provided. The grater 20 includes a base 22 having, as seen in FIGS. 3, 4 and 12, an aperture 24. Disposed above the base 22 is a housing 26 within which a hollow, cylindrical grater blade 28 is disposed. The housing 26 includes a part-cylindrical sidewall 30 and, as best seen in FIGS. 3, 4, 6, 11 and 12, a generally cylindrical ring 31 attached to the upper end of the cylindrical sidewall 30. The generally cylindrical ring 31 has an aperture 32, a shoulder 33 and a wall 34 extending downwardly from the shoulder 33. The base 22, sidewall 30 and generally cylindrical ring 31 can be a one-piece molded plastic construction.

As seen in FIGS. 2 and 7–10, a door 35 is attached by a hinge 36 to one end of the sidewall 30. As best seen in FIGS. 7, 8 and 13, the hinge 36 includes an upper loop 36A integral with sidewall 30, a lower cylindrical portion 36B integral with the door 35 and coaxial with the upper loop 36A and having an upper bore 36C and a lower bore 36D. The hinge 36 also includes an upper pin 36E disposed through the upper loop 36A and into the upper bore 36C. The hinge 36 also includes a one-piece lower pin 36F having an upper portion 36FA disposed in the lower bore 36D, by press fitting or the like, to couple the lower pin 36F to the door 35. The lower pin 36F also has a central portion 36FB disposed through an aperture 37 in the base 22 and a stop portion 36FC disposed below the aperture 37.

The door 35 has a part-cylindrical portion 38 connected at a first end 39 to the sidewall 30 and a thinner, flexible tambour or extension 40 connected to a second end 41 of the part-cylindrical portion 38. The extension 40, as discussed below, must be made of flexible material, such as a thin sheets of stainless steel or a thin sheet of plastic. Plastics made by E. I. Du Pont de Nemours & Co. under the tradename Delrin or by Hoescht-Celanese under the tradename Flex-Rite may be useful. In use, at least a portion of the extension 40 is disposed between the grater blade 28 and the sidewall 30, as will be explained more fully below.

The grater blade 28 is usually made of stainless steel and can be formed by stamping and rolling a stainless steel sheet into a cylinder. The grater blade 28 is attached to an upper blade cap 42 and a lower blade cap 44. The upper blade cap 42, lower blade cap 44 and grater blade 28 form a cutter assembly 45. The upper blade cap 42 and lower blade cap 44 can be made of a plastic and molded or pressed onto the ends of grater blade 28.

The lower blade cap 44, as seen in FIGS. 3 and 4, includes an upper portion 46 disposed through the aperture 24 of the base 22 and having a diameter substantially equal to or slightly less than the diameter of the aperture 24. The lower blade cap 44 also has a larger diameter lower portion 48 integral with the upper portion 46 thereby forming an annular shoulder 50. The annular shoulder 50 extends beyond the edges of the aperture 24 and aids in preventing upward vertical movement of the cutter assembly 45. The lower blade cap 44 is hollow and has an opening 52 which allows grated food particles to exit the grater 20.

The upper blade cap 42 has an axial internally threaded hub 54, an end face 56, and a sidewall 58. The sidewall 58 has an upper portion 60 disposed in the aperture 32 of the cylindrical ring 31, a larger diameter lower portion 62 in slidable contact with the wall 34 of the cylindrical ring 31 and an annular shoulder 64 in slidable contact with the shoulder 33 of the cylindrical ring 31.

As seen best in FIG. 3, the cutter assembly 45 is attached to a crank assembly 66 for a user to manually rotate the grater blade 28. The crank assembly 66 includes a crank arm 68 integral with a threaded stud 70 which is screwed into the threaded bore 54 of the upper blade cap 42 to attach the crank assembly 66 to the cutter assembly 45. The crank assembly 66 also includes a hollow, substantially cylindrical connecting post 72 integral at its lower end with the crank arm 68. The upper end of the connecting post 72 is bifurcated by an axial slot 74 with each bifurcated half having a radially outwardly extending semi-annular shoulder 76.

The crank assembly 66 is connected to a knob 78. The knob 78 has an upper core member 80 assembled to a lower core member 82 having a cylindrical wall 84 defining an axial bore 85. The lower core member 82 and upper core member 80 can be made out of a plastic, such as polypropylene. The assembled lower core member 82 and upper core member 80 are overmolded with an outer member 86 made of a plastic or rubber, such as santoprene.

The knob 78 is attached to the connecting post 72 by squeezing the two semi-annular shoulders 76 together and by inserting the upper end of the connecting post 72 into the axial bore 85 until the semi-annular shoulders 76 are disposed above the upper end of the cylindrical wall 84, thereby locking the knob 78 to the connecting post 72.

The door 35 can advantageously be moved from a closed position, shown in FIGS. 1, 2, 3, 5, 7, 9, 11 and 13, to an open position, shown in FIGS. 4, 6, 10 (solid line) and 15. The door 35 includes a generally D-shaped handle 87 extending radially outwardly from the end of the part-cylindrical portion 38 of the door 35 with which a user can grasp and move the door 35.

In the closed position, the second end 41 of the part-cylindrical portion 38 abuts the sidewall 30 and the extension 40 is entirely disposed between the grater blade 28 and the sidewall 30. The part-cylindrical portion 38 of the door 35 and the sidewall 30 of the housing 26 thereby cooperate to form a cylindrical outer wall surface (FIG. 9). For molding or other reasons, the sidewall 30 and the portion 38 of the door 35 can also be part-frustoconical (rather than part-cylindrical) shaped to form a frustoconical shaped outer wall surface.

As seen best in FIGS. 3 and 4, the upper portion 46 of the lower blade cap 44 and the lower end of inside surface of the sidewall 30 form a part-circular lower track 88 therebetween. Similarly, the lower portion 62 of the upper blade cap 42 and the upper end of the inside surface of the sidewall 30 form a part-circular upper track 90 therebetween. The upper and lower edges of the flexible extension 40 are received and moveable in the upper and lower tracks 90 and 88, respectively, when the door 35 is moved between the open and closed positions. The portion of the extension 40 disposed between the grater blade 28 and the sidewall 30 is substantially concentric with the grater blade 28 and the sidewall 30. Since the extension 40 is flexible, it conforms in the tracks 88, 90 to the contour of the sidewall 30 and grater blade 28, so that only a minimum amount of space is required between the grater blade 28 and the sidewall 30.

As seen best in FIGS. 6 and 11, the door 35 is maintained in the closed position by a closing tab 92 projecting radially inwardly from the inside surface of the part-cylindrical portion 38, the closing tab 92 is engageable with a cavity or detent 94 disposed on the generally cylindrical ring 31 (FIGS. 6 and 11).

As best seen in FIGS. 14–16, the stop portion 36FC has a teardrop-like shape in transverse cross-section and has a concave outer surface 95 and a convex outer surface 96. In the closed position, the convex outer surface 96 is in rotatable contact with the outer surface of the lower blade cap 44.

The door 35 is moved to the open position by grasping the D-shaped handle 87 and pulling the door both slightly radially outward from the generally cylindrical ring 31 to disengage the tab 92 from the detent, and circumferentially away from the end of the sidewall 30. The part-cylindrical portion 38 of the door 35 is rotated about the axis of the hinge 36 along with the coupled lower pin 36F until the concave outer surface 95 of the stop portion 36FC is substantially fully in contact with the outer surface 95 of the lower blade cap 44 which prevent further clockwise rotation of the door 35 (FIGS. 10 and 15).

When the door is in the open position, the extension 40 has been moved along the upper track 90 and lower track 88 so that a smaller portion of the extension 40 is now disposed in the tracks 88, 90 between the grater blade 28 and the inside surface of the sidewall 30 than when the door 35 is in the closed position.

The base 22, grater blade 28 and door 35 cooperate to define a variable volume compartment 98 in which food to be grated is placed. When the door 35 compartment is in the open position, the compartment 98 has a greater volume than when the door is in the closed position. The stop portion 36FC prevents excess door movement to ensure that, in use, a portion of the extension 40 is always maintained between the sidewall 30 and the grater blade 28, even in the open position. This allows the compartment 98 to always be fully enclosed on all sides except its top to prevent the escape of food to be grated from the compartment 98 of the grater 20.

The grater 20 is used to grate food as follows. The door 35 is moved to the open position, as described above. The crank assembly 66 is rotated to the position shown in FIG. 4, uncovering the compartment 98. A piece of food, such as a cheese block 100, is inserted into the compartment 98. A user grasps the sidewall 30 with the palm of his hand and the door 35 with the fingers of the same hand and squeeze his hand together so that the door 35 forces the cheese block 100 against the grater blade 28. With his other hand, the user grabs the knob 78 and rotates the crank assembly 66, which rotates the grater blade 28 and grates the block 100 into grated cheese. The grated cheese 102 then falls through the opening 52 of the lower blade cap 44 and onto its desired substrate.

As best seen in FIGS. 8, 12 and 16, the interior of the grater 20 is easily accessed for cleaning. First, the crank assembly 66 is totally unscrewed from the upper blade cap 42. The cutter assembly 45 is then pulled down from the cylindrical ring 31 in the direction of the arrow in FIG. 12 through the aperture 24 in the base 22 to remove the cutter assembly 45 from the remainder of the grater 20. Since the lower blade cap 44 is no longer in the way of the stop portion 36FC, the door 35, as seen in phantom in FIGS. 10 and 16, can be further rotated so that the extension 40 is removed from the tracks 88, 90 (FIG. 10) and free access is gained to the interior surface of the door 35 and other interior surfaces of the grater 20.

As seen best in FIGS. 3, 4 and 12, the grater blade 28 has a plurality of teeth 110 arranged in a spiral line pattern 112 about the outer surface periphery of the grater blade 28. The grater blade also includes a spiral outer surface region 114 that is free of teeth, whereby the teeth pattern on the grater blade 28 resembles a barbershop pole.

The spiral line pattern 112 of teeth 110 covers only about fifty percent or less of the outer surface area of the grater blade 28, yet grinds the cheese 100 or other food in compartment 98 evenly. This is because the number of teeth 110 along any circle transverse to the axis of the grater blade 28 is substantially the same.

Since this spiral line pattern 112 of teeth 110 require fewer teeth than conventional grater blades whose outer surfaces are completely covered with teeth, fewer teeth 110 are in contact with the food to be grated. This makes it easier to get the grater blade 28 into motion and allows the grater blade 28 to be rotated easier and faster with less manual power than conventional graters, while still grating food evenly.

While particular embodiments of the present invention have been shown and described, it will be appreciated by those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A food grater comprising:

a housing sidewall;

a grater blade disposed adjacent to the housing sidewall;

a moveable door having an extension, the moveable door being connected to the housing sidewall for movement between open and closed positions, in each of which positions at least a portion of the extension is disposed between the housing sidewall and the grater blade with a greater portion of the extension being disposed between the housing sidewall and the grater blade when the door is in the closed position than when the door is in the open position, the door cooperating with the housing sidewall to encompass the blade, and the door cooperating with the grater blade to define a variable volume food-receiving compartment which has a greater volume when the moveable door is in the open position than when the moveable door is in the closed position; and an actuator coupled to the grater blade or housing sidewall effecting relative movement therebetween.

2. The food grater of claim 1, wherein the actuator is manually operated.

3. The food grater of claim 1, and further comprising a base having an opening therethrough, wherein the grater blade is hollow and cylindrical and disposed above the opening.

4. The food grater of claim 1, wherein the housing sidewall has an inside surface and an outside surface and the extension moves in a track disposed between the inside surface and the grater blade when the door is moved between the open and closed positions.

5. The food grater of claim 4, wherein the housing sidewall is part-cylindrical and the track is part-circular.

6. The food grater of claim 5, wherein the portion of the extension disposed between the housing sidewall and the grater blade is substantially concentric with the housing sidewall.

7. The food grater of claim 5, wherein the housing sidewall has first and second ends and the door has a part-cylindrical portion having an inside surface and an outside surface and first and second ends, the first end of the part-cylindrical portion connected to first end of the housing sidewall and the second end of the part-cylindrical portion connected to the extension, wherein when the door is in the closed position the second end of the part-cylindrical portion abuts the second end of the housing sidewall whereby the outside surface of the housing sidewall and the outside surface of the part-cylindrical portion form a substantially cylindrical outer surface.

8. The food grater of claim 7, wherein the first end of the part-cylindrical portion is hingedly connected to the first end of the housing sidewall by a hinge.

9. The food grater of claim 8, wherein the hinge includes a door stop for inhibiting movement of the door in an opening direction beyond the open position.

10. The food grater of claim 9, wherein the hinge has an axis and the grater blade is cylindrical and has an axis substantially parallel to the axis of the hinge, and further comprising a blade cap disposed at a lower axial end of the grater blade, wherein the door stop is disposed at substantially the same axial position as the blade cap for engagement therewith.

11. The food grater of claim 1, and further comprising a door stop coupled to the door for inhibiting movement of the door in an opening direction beyond the open position.

12. The food grater of claim 1, wherein the extension is thinner than the part-cylindrical portion of the door and constructed of a flexible material.

13. The food grater of claim 12, wherein the portion of the extension disposed between the grater blade and the housing sidewall is substantially concentric with grater blade.

14. The food grater of claim 13, wherein when the door is in the open position a portion of the extension is not disposed between the grater blade and the housing sidewall and is not concentric with grater blade.

15. The food grater of claim 1, wherein the grater blade is cylindrical and includes an outer surface having a plurality of teeth disposed about the outer surface in a spiral pattern and a spiral region free of teeth adjacent to the spiral pattern.

16. A cylindrical grater blade for a food grater comprising an outer surface including a first spiral band having a first length, a first upper boundary and a first lower boundary and a first width measured between the first upper boundary and the first lower boundary, a plurality of teeth distributed along the first length and the first width wherein each tooth has a tooth width less than the first width, and a second spiral band free of teeth and disposed outside the first spiral band, the second spiral band having a second length, a second upper boundary contiguous with the first lower boundary, a second lower boundary contiguous with the first upper boundary, and a second width measured between the second upper boundary and the second lower boundary, the second width being greater than the distance between any two adjacent teeth along the first width.

17. The grater blade of claim 16, wherein the blade has a cylindrical axis and substantially the same number of teeth is disposed about any circle transverse to the axis.

18. The grater blade of claim 16, wherein the first spiral band comprises about fifty percent or less of the area of the outer surface.

19. The grater blade of claim 16 wherein the teeth are substantially equidistantly spaced along the first width and are substantially equidistantly spaced along the first length.

20. The grater blade of claim 16, wherein the teeth are arranged in a plurality of spiral rows.

21. A cylindrical grater blade for a food grater comprising an outer surface including a first spiral band having a plurality of spiral rows of teeth including an upper spiral row of teeth and a lower spiral row of teeth respectively defining upper and lower boundaries of the first spiral band, and a second spiral band free of teeth and disposed outside the first spiral band, the second spiral band having a length and a width, the width being greater than the distance between any two adjacent spiral rows of teeth in the first spiral band.

* * * * *